United States Patent [19]
Culberson et al.

[11] Patent Number: 6,129,550
[45] Date of Patent: Oct. 10, 2000

[54] EDUCATING SPECIAL NEEDS CHILDREN ABOUT PLACE SETTINGS

[75] Inventors: Judith L. Culberson; Dean A. Caldwell, both of Winston-Salem; Christie Lockhart, Fayetteville, all of N.C.

[73] Assignee: Kaplan Companies, Inc., Lewisville, N.C.

[21] Appl. No.: 09/267,484

[22] Filed: Mar. 11, 1999

[51] Int. Cl.⁷ .................................................. G09B 21/00
[52] U.S. Cl. .................. 434/112; 434/258; 434/236; 434/365; 434/433; D6/616; 283/115
[58] Field of Search ..................... 434/365, 382, 434/387, 428, 247, 258, 259, 236, 237, 238, 112, 433; 446/71, 73, 147; 281/16; D6/616; 283/115, 117; 273/440

[56] References Cited

U.S. PATENT DOCUMENTS

| | | | |
|---|---|---|---|
| D. 264,790 | 6/1982 | Kamel et al. | D6/271 |
| D. 387,941 | 12/1997 | Nicodemus | D6/616 |
| 2,244,590 | 6/1941 | Vonderheid | 434/382 |
| 3,579,862 | 5/1971 | Ballen | 434/345 |
| 3,744,150 | 7/1973 | Folson . | |
| 3,750,309 | 8/1973 | Tovar | 434/382 |
| 3,775,868 | 12/1973 | Moore | 434/259 |
| 4,478,583 | 10/1984 | Sellers | 434/259 |
| 4,484,529 | 11/1984 | Caldares | 108/90 |
| 4,830,619 | 5/1989 | Marion | 434/382 |
| 4,907,539 | 3/1990 | Abulhasan | 119/52.1 |
| 5,603,559 | 2/1997 | Yemini | 312/333 |
| 5,626,477 | 5/1997 | Adkison | 434/128 |

*Primary Examiner*—Sam Rimell
*Assistant Examiner*—Bena B. Miller
*Attorney, Agent, or Firm*—Charles W. Calkins; J. Michael Boggs; Kilpatrick Stockton LLP

[57] ABSTRACT

An apparatus for educating children with special educational needs about how to set a table includes a mat having emblems thereon indicative of the locations for proper placement of a napkin, a plate, flatware and a drinking vessel. The emblems are each filled-in outlines of the item to be placed thereon and colored a distinctive primary color. Also included is a set of napkin, plate, flatware and a drinking vessel for a child with special educational needs to place on the mat. The napkin, plate, flatware and drinking vessel have colors that match the corresponding color of the emblem therefor on the mat. A teaching criteria manual has instruction for a teacher to guide the student in the process of setting the table by using the matching colors and shapes to appropriately place the napkin, plate, flatware and drinking vessel on the mat. A carton for containing the mat and the napkin, plate, flatware and drinking vessel is sized to contain the mat and the other items on the mat within the carton, without the need of folding the mat, and the carton has a closeable and lockable lid and carry handle.

20 Claims, 4 Drawing Sheets

EDUCATING SPECIAL NEEDS CHILDREN ABOUT PLACE SETTINGS

BACKGROUND OF THE INVENTION

The present invention relates to an educational manipulative to assist special needs children to learn how to set a table.

The present invention provides a product designed for two primary categories of children with special needs. The first category is Educable Mentally Handicapped (EMH) children, who are able to be taught in a classroom setting and have the potential to progress into a vocational-tech career path. The second category is Trainable Mentally Handicapped (TMH) children, who have the abilities to understand and use what they have learned, but on a limited basis. Both groups of children, if properly taught, have the possibility of moving into Independent Living Environments.

The present invention may also benefit individuals with motor or cognitive difficulties that are not necessarily categorized as mentally handicapped. For instance, the apparatus of the invention could be used by adults who need special assistance with fine motor skills, including individuals who suffer from strokes or other impairments that require some type of therapeutic intervention.

Historically, children with special needs have been overlooked by the educational establishment. As such, there are limited tools available to assist special needs children to learn even rudimentary skills for living, such as setting a table. Largely, this has been on the assumption that special needs children simply were incapable of learning, or that they would learn through repeated trial and error, and by following the example of others in setting a table.

An effective training system teaches an important and useful skill that is fun for the student. The system should be designed to the level of the learning ability of the student because one that is too complicated will frustrate and cause confusion. This is especially important when training persons with learning disabilities and also those having short attention spans who may become easily frustrated. Many of the currently available training systems for teaching a student how to set a table are geared to skill levels above persons in these groups.

Existing training tools are often complicated. Even after a student has been instructed on how to perform the lesson, they may still be apprehensive and uncertain when required to perform the lesson independently. These types of training systems are often not enjoyed by the students resulting in their reluctance or refusal to use them.

None of the techniques are suitable for the current educational climate in which the education of special needs children is finally being properly addressed. In particular, the educational establishment has yet to come up with appropriate kits or manipulatives to assist special needs children in learning how to set a table.

Therefore, there is a need for a system of training students how to set a table that uses intuitive and relaxed methods that students can understand and use independently after a minimal amount of instruction.

SUMMARY OF THE INVENTION

The present invention fulfills this need in the art by providing an apparatus for educating children with special educational needs about how to set a table, including a mat having emblems indicative of the locations for proper placement of a napkin, a plate, flatware, and a drinking vessel. The emblems each are filled-in outlines of the item to be placed thereon and colored a distinctive color. The apparatus has items including a set of napkin, plate, flatware, and a drinking vessel. This permits a child with special educational needs to place on the mat, the plate, flatware, and the drinking vessel having colors that match the corresponding color of the emblem therefor on the mat.

The flatware may include a knife, a fork, and a spoon. Preferably, the knife, fork and spoon each is made of a metallic operative part and a non-metallic handle part having the color that matches the corresponding color of the emblem therefor on the mat. More preferably, the flatware also includes a salad fork. The drinking vessel preferably includes first and second glasses. The plate is typically a dinner plate, and may include a salad plate.

The apparatus may include a teaching criteria manual having instruction for a teacher to guide the student in the process of setting the table by using the matching colors and shapes to appropriately place the napkin, plate, flatware, and drinking vessel on the mat.

Preferably, the emblems are all primary colors. In a preferred embodiment, no emblem colors are duplicated except for very differently-shaped ones of the napkin, plate, flatware, and drinking vessel.

In one embodiment, the mat has the emblems on a front side and has a plain backside. The apparatus includes an overlay with emblems that have the shape, but not the color, of the napkin, plate, flatware, and drinking vessel. Thus, the overlay can be placed on the plain backside of the mat to provide the child with shape information but not color information as to the appropriate location of the napkin, plate, flatware, and drinking vessel, as a more advanced learning stage.

Preferably, the napkin has color and shape indicia to assist the child in learning how to properly fold the napkin.

The apparatus may also include a carton for containing the mat and the napkin, plate, flatware and drinking vessel, with the carton sized to contain the mat without need of folding the mat and the other items on the mat and within the carton, the carton having a closeable and lockable lid and a carry handle.

The invention also provides a method of teaching a child with special educational needs about how to set a table, including positioning within the child's reach a mat having emblems indicative of the locations for proper placement of a napkin, a plate, flatware and a drinking vessel. The emblems each are filled-in outlines of the item to be placed thereon and colored a distinctive color. The method includes supplying to the child with special educational needs a set of napkin, plate, flatware and drinking vessel having colors that match corresponding colors of the emblem therefor on the mat, and encouraging the child to place the napkin, plate, flatware and drinking vessel on the emblems on the mat.

The invention also provides another method of teaching a child with special educational needs about how to set a table, including positioning within the child's reach a mat having emblems on a front side thereof front side down to obscure the front side and exposing a plain backside. The method includes positioning on the plain backside of the mat an overlay with emblems that have shapes but not color, indicative of the locations for proper placement of a napkin, a plate, flatware and a drinking vessel. The method also includes supplying to the child with special educational needs a set of napkin, plate, flatware and drinking vessel having shapes that match corresponding shapes of the emblem therefor on the overlay, and encouraging the child to place the napkin, plate, flatware and drinking vessel on the emblems on the overlay.

The invention further provides a method of teaching a child with special educational needs about how to set a table including positioning within the child's reach a mat having emblems on a front side thereof front side down to obscure the front side and exposing a backside having emblems that have shapes but not color, indicative of the locations for proper placement of a napkin, a plate, flatware and a drinking vessel. The method includes supplying to the child a set of napkin, plate, flatware and drinking vessel having shapes that match corresponding shapes of the emblem therefor on the mat, and encouraging the child to place the napkin, plate, flatware and drinking vessel on the emblems on the mat.

DETAILED DESCRIPTION OF THE PREFERRED EMBODIMENT

Figure 1:
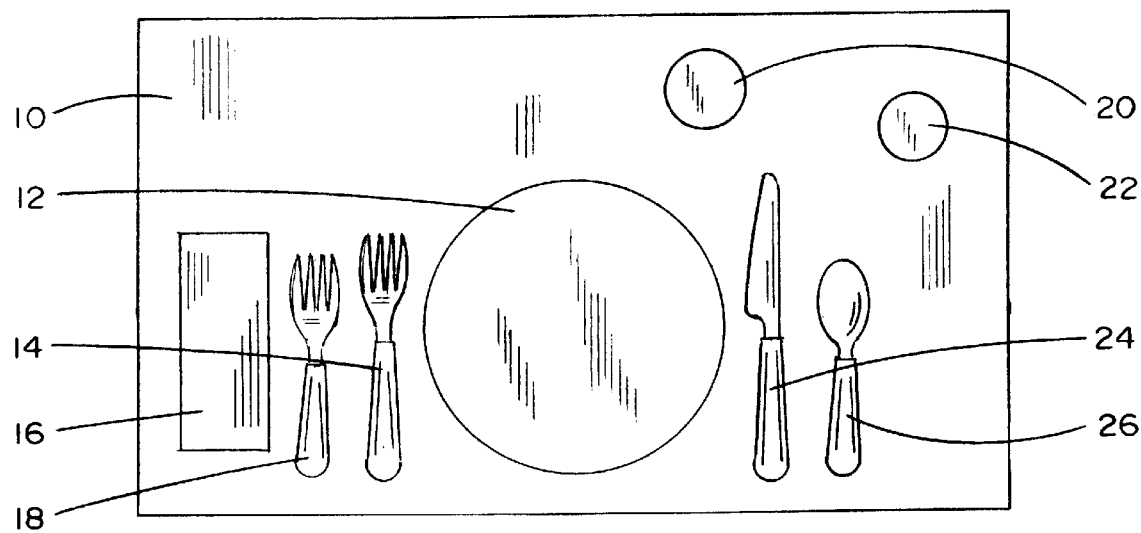
FIG. 1 is a plan view of a mat useful in an embodiment of the invention.

Referring now to FIG. 1, there is seen a mat 10 suitable for use in accordance with the present invention. The mat is preferably of washable fabric material and is printed with certain emblems or indicia to be discussed in more detail hereinafter. Although the material of the mat 10 can be any suitable material, preferably it is a washable fabric so that it can be readily cleaned by simple washing and drying. Alternatively, it could be plastic or paper or other similar flat material that can be suitably imprinted with the emblems described hereinafter.

The emblems printed on the mat 10 include a large, red circle 12 in the center, and a small, blue circle 20, and a small, orange circle 22 in the upper right corner of the mat 10. To the left of the red circle 12 is a depiction of a fork 14 having tines and an orange handle. A salad fork red outline 18 is also provided with a red handle. Also to the left of the red circle 12, the yellow outline of a napkin 16 is imprinted on the mat 10. If desired, other eating utensils may be represented by emblems, such as a salad plate, a cup and saucer, and the like. To the right of the large, red circle is an emblem depicting a knife 24, having a blue handle, and a spoon 26, having a yellow handle.

Preferably, the colors are bright, primary colors, which are appealing to special needs children. As can be appreciated, this means that some colors are duplicated, which is acceptable for differently shaped items, such as the plate and salad fork, since the shape cues are so different from on another. Of course, other color schemes can be used.

Figure 2:
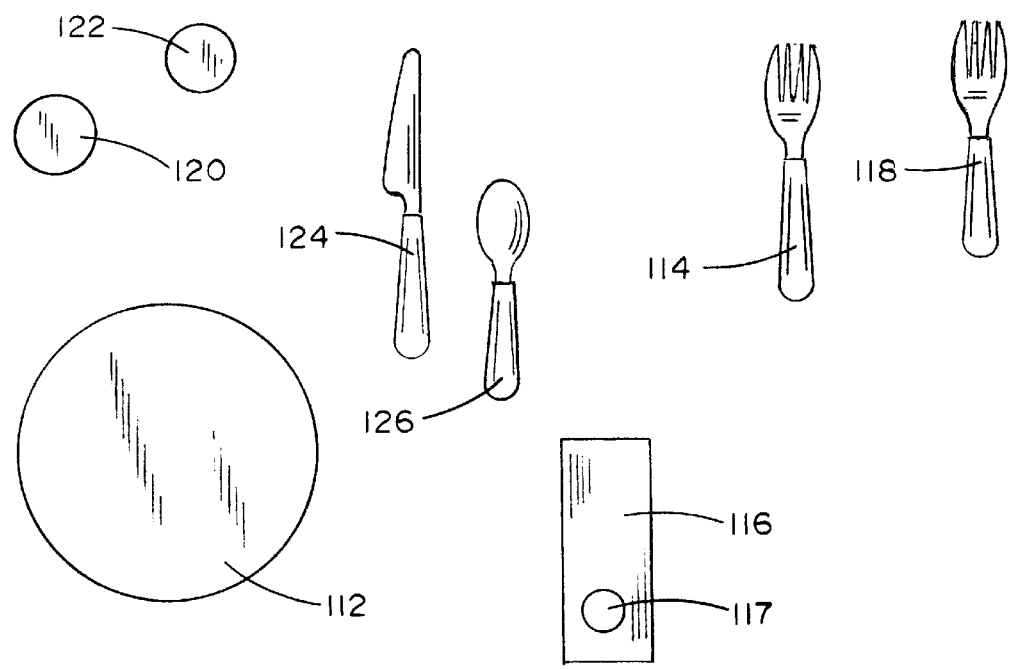
FIG. 2 is a schematic top view of utensils useful in an embodiment of the invention.

FIG. 2 depicts in schematic form the various utensils that are commonly used in a dinner time place setting, including a red plate 112, a blue glass 120, and an orange glass 122. The assembly also includes a fork 114 having an orange handle, a fork 118 having a red handle, a knife 124 having a blue handle, and a spoon 126 having a yellow handle. Finally, there is a napkin 11 6, which preferably has a celebratory logo 117.

In use, the mat 10 can be placed within reach of the special needs child, with none of the items depicted in FIG. 2 positioned on the mat 10. The child can then be provided with the collection of goods seen in FIG. 2 and encouraged to place them on the mat 10 in a proper arrangement to provide a place setting. In so doing, the child is guided by the fact that the shape and color of the item to be placed matches the shape and color of the emblem on the mat 10 to enable the child to properly locate the items to make a correct place setting.

Figure 3:
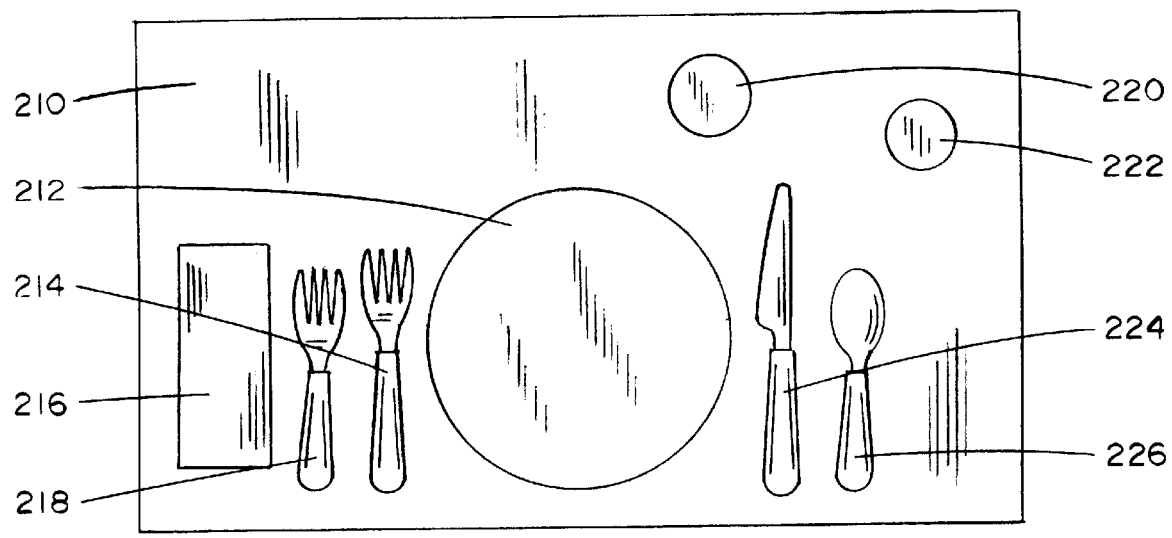
FIG. 3 is a plan view of an overlay useful in an embodiment of the invention and also depicts the backside of the mat in an alternate embodiment.
Figure 4:
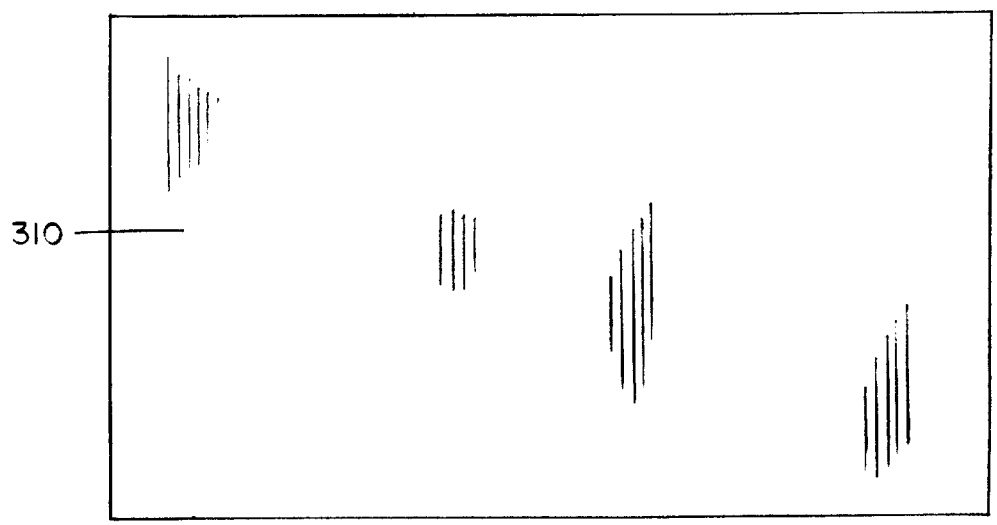
FIG. 4 is a plan view of a backside of a mat useful in an embodiment of the invention.

As will be apparent, the special needs children have varying degrees of capability, and with repetition, many special needs children can master the proper location of the eating utensils on the mat of FIG. 1. After some degree of such learning has taken place, the child's educational achievement can be taken to a higher level using the embodiments shown in FIGS. 3 and 4. FIG. 4 depicts the mat 10 reversed, so that its backside 310, which is devoid of the emblems, is exposed. While it may be too much of a challenge to have the child immediately locate the utensils from FIG. 2 on the mat of FIG. 4, that challenge can be ameliorated by adding the overlay 210 depicted in FIG. 3 onto the backside 310 of the mat of FIG. 4.

The overlay 210 is provided with emblems of the same shape and location as the emblems of FIG. 1, but without the color, so that the child has only the outline of the items as a guide and not the color cues. Thus, the child would be cued to locate the large, round, red plate 112 onto the large circle 212, the large, orange-handled fork 114 onto the outline of a large fork 214, the smaller, red fork 118 onto the outline of the smaller fork 218, and the napkin 116 onto the outline of a napkin 216. Similarly, the blue glass 120 could be located on the uncolored circle 220, and the orange glass 122 could be located on the uncolored circle 222. Note that in this embodiment, both circles 220 and 222 are of the same size, so that if the teacher insists on blue glass 120 being located in line with the knife 224, that additional memory challenge can be given to the child. Also to the right of the large circle 212 is the outline of a knife 224 for proper location of the knife 124, and the outline of a spoon 226 for proper location of the spoon 126. When the child has mastered using the placement of the items on the overlay, he or she can progress further by use of the plain backside 310 without even the cues of the overlay.

In another embodiment, the backside can be imprinted with the outlines shown for the overlay 210, and the overlay can be omitted.

Figure 5:
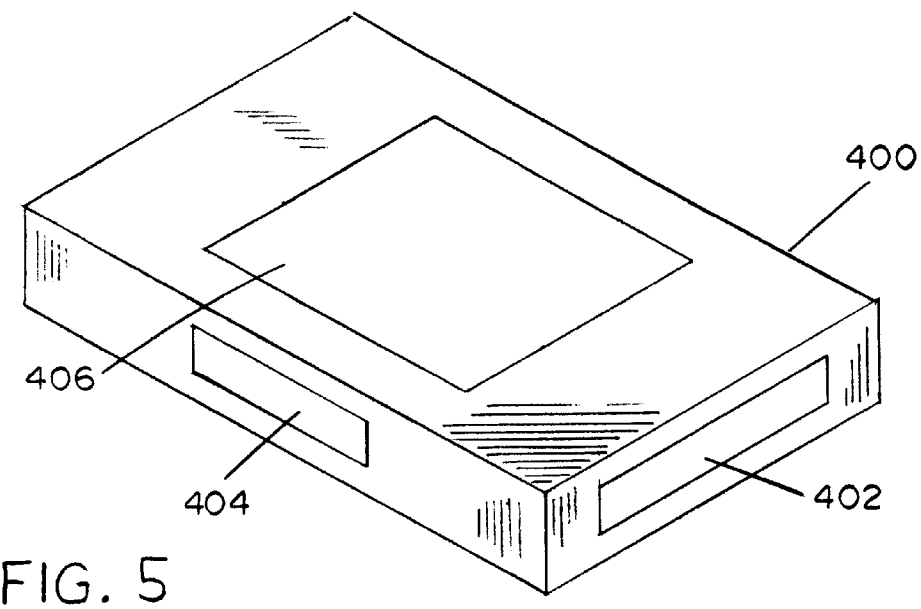
FIG. 5 is a top perspective view of a carton useful in an embodiment of the invention.

FIG. 5 depicts a carton 400 for holding the mat and utensils of FIG. 2 so that they may be stored in a classroom for ready accessibility to the teacher of special needs children. The carton 400 can be provided with a top label 406 indicative of the contents of the carton and a side label 402. The carton is preferably a corrugated cardboard, but other materials can be used. The top label 406 can be adhered to a hinged lid, which can be closed and secured by an interlocking handle 404 in a locked position.

Figure 6:
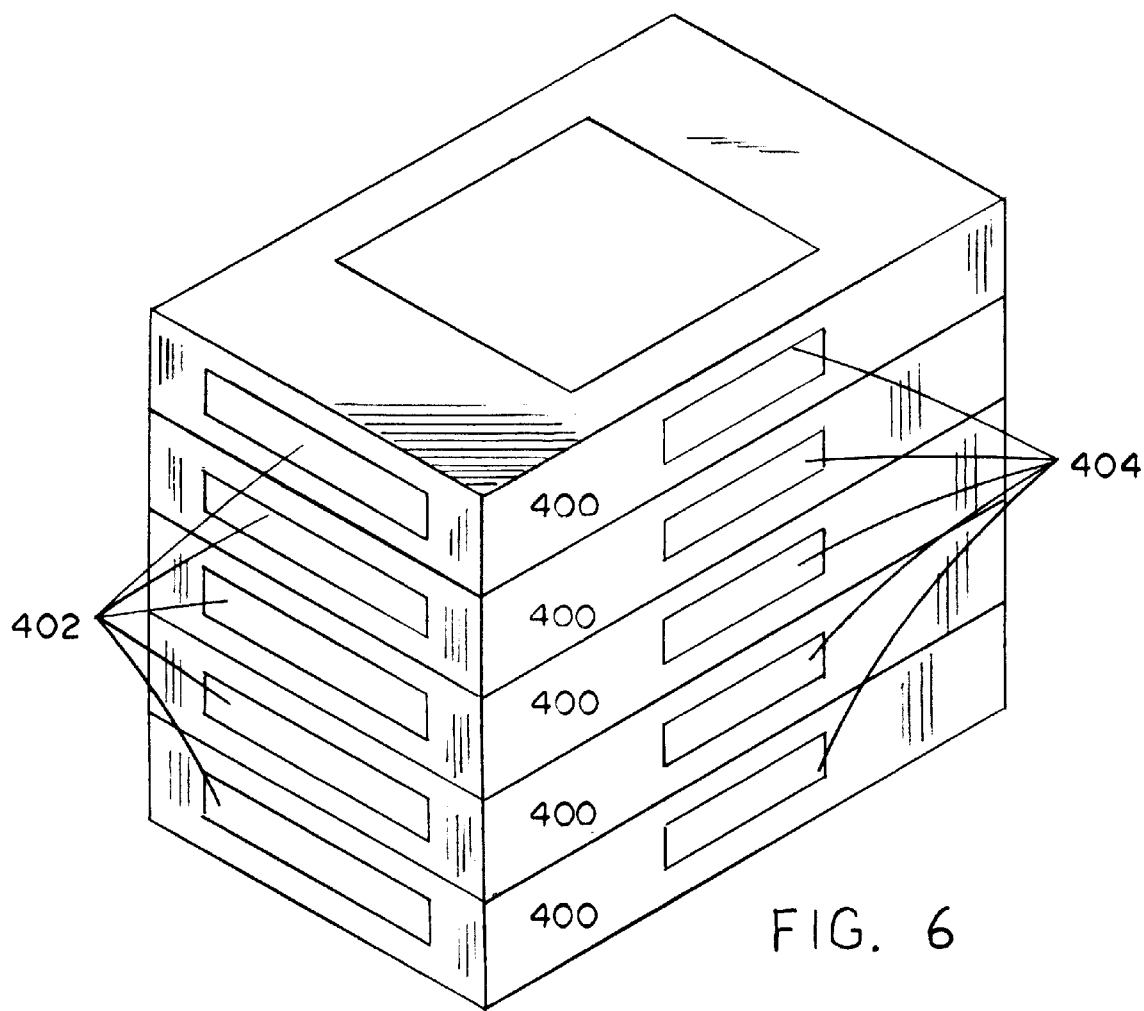
FIG. 6 is a top perspective view of a stack of cartons like the one depicted in FIG. 5 useful in an embodiment of the invention.

Given that special needs children will have a number of different life skills to learn, they will all preferably be available in a classroom or other educational setting, and can be retrieved for use on a selected basis. Thus, a stack of the cartons 400 as seen in FIG. 6 can be provided such that their individual side labels 402 are visible, and the appropriate carton holding manipulatives contents can be retrieved by the teacher for use as needed.

In addition, the carton 400 may be used by the child to take the apparatus home for further exercises or to demonstrate his or her success to his or her family.

The kit preferably also includes a teacher criteria manual which is preferably in the form of an A-frame flip-chart. This format makes one side of the pages of the flip-chart accessible to the teacher to see instructions and a reverse side of the sequential page having considerable graphics is available for the child to see on the other side. This permits the teacher to have the appropriate prompts to assist the child in a successful educational endeavor.

Figure 7A:
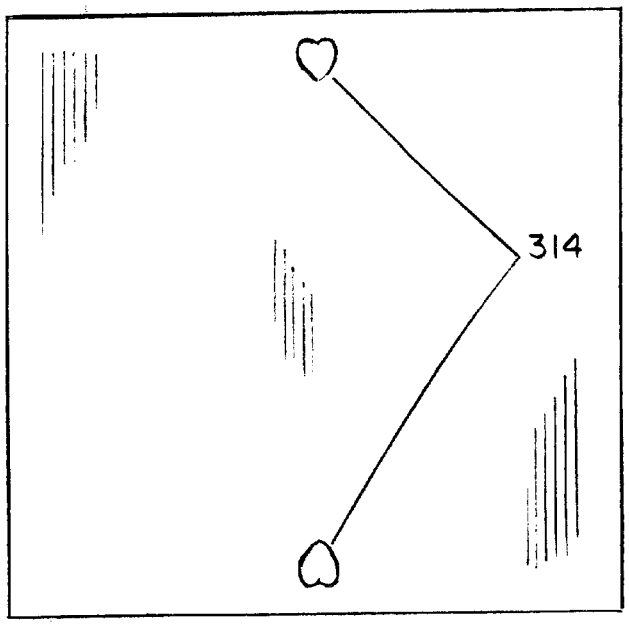
FIGS. 7A–7D are plan views of the napkin, showing how it can be folded.
Figure 7B:
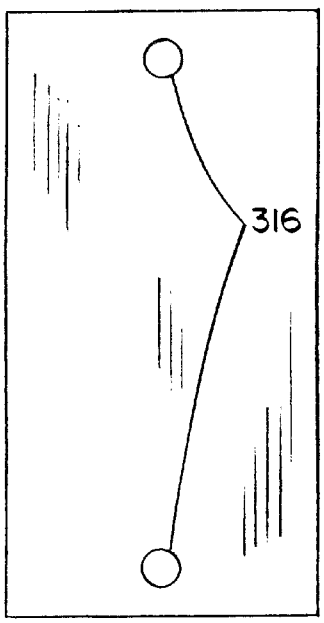
Figure 7C:
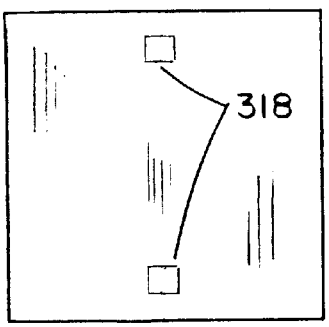
Figure 7D:
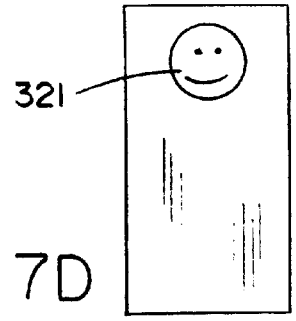

The teaching criteria manual may show the following instructions for use:

To guide student in the process of setting the table Student will be able to follow the colors and shapes to set a table
1- Set DINNER plate on the—RED Circle
2- Set Glass on the—BLUE Circle
3- Set Small optional glass on—ORANGE shape
4- Set Knife on the—BLUE knife shape
5- Set Spoon on the—YELLOW Spoon shape
6- Set Salad Fork on the—RED salad fork shape
7- Set Dinner Fork on the—ORANGE dinner fork shape
8- Set Napkin on the—White/Yellow napkin shape Illustrated in FIGS. 7A–7D, is an unfolded napkin 300, with sequential folding steps shown. FIG. 7A illustrates the front view of the napkin having a pair of heart-shaped icons 314. When the child folds the napkin to match the two heart icons 314 and rotates the folded napkin by 90 degrees, he or she encounters the folded view shown in FIG. 7B, with two circle icons 316. The child again matches together the icons to place the napkin in the orientation viewed in FIG. 7C, and rectangular icons 318 become visible. After folding the napkin again to match the icons 318 and rotating the folded napkin, the completion icon 321 is visible, as seen in FIG. 7D. The child understands that when he or she completes matching the icons such that the completion icon 321 is visible, he or she has successfully folded the napkin. Preferably, the completion symbol is a smile-shape, thumbs-up, or other positive symbol to congratulate the student and encourage continued learning. Most preferably, it is a symbol of a hand, so the child can be prompted to "high five" at his or her success. When the completion icon 321 is not visible, the child understands that the article has not been folded properly or there are additional folding steps. Prompts to show these steps may be included in the teacher criteria manual.

Those of ordinary skill in the art will understand that the invention can be carried out in various ways, and that it is not limited to the specific embodiments disclosed herein. It should be understood that all such modifications and improvements have been deleted herein for the sake of conciseness and readability but are properly within the scope of the following claims.

What is claimed is:

1. An apparatus for educating children with special educational needs about how to set a table comprising:
   a mat having emblems indicative of the locations for proper placement of a napkin, a plate, flatware and a drinking vessel, said emblems each being filled-in outlines of an item to be placed thereon and colored a distinctive color; and
   a set of a napkin, a plate, flatware and a drinking vessel for a child with special educational needs to place on said mat, said plate, flatware and drinking vessel having colors that match the corresponding color of the emblem therefor on said mat.

2. The apparatus according to claim 1 wherein said flatware includes a knife, a fork and a spoon.

3. The apparatus according to claim 2 wherein said knife, fork and spoon each is made of a metallic operative part and a non-metallic handle part having color that matches a corresponding color of the emblem therefor on the mat.

4. The apparatus according to claim 1 wherein said flatware includes a knife, a salad fork, a dinner fork and a spoon.

5. The apparatus according to claim 1 wherein said mat includes emblems for two glasses and said drinking vessel includes first and second glasses.

6. The apparatus according to claim 1 wherein said plate includes a dinner plate.

7. The apparatus according to claim 1 further comprising a teaching criteria manual having instruction for a teacher to guide the student in a process of setting the table by using the matching colors and shapes to appropriately place the napkin, plate, flatware and drinking vessel on the mat.

8. The apparatus according to claim 1 wherein said emblems are all primary colors.

9. The apparatus according to claim 1 wherein no emblem colors are duplicated except for very differently-shaped ones of the napkin, plate, flatware and drinking vessel.

10. The apparatus according to claim 1 wherein said mat has the said emblems on a front side and has a plain backside and further comprising an overlay with emblems that have shapes but not the color of the napkin, plate, flatware and drinking vessel,
    whereby the overlay can be provided to be placed on the plain backside of the mat to provide the child with shape information but not color information as to the appropriate location of the napkin, plate, flatware and drinking vessel.

11. The apparatus according to claim 1 wherein said napkin has color and shape indicia to assist the child in learning how to properly fold the napkin.

12. The apparatus of claim 1 further comprising a carton for containing the mat and the napkin, plate, flatware and drinking vessel, said carton sized to contain said mat and the napkin, plate, flatware, and drinking vessel on the mat within the carton, without the need of folding said mat, said carton having a closeable and lockable lid and carry handle.

13. An apparatus for educating children with special educational needs about how to set a table comprising:
    a) a mat having emblems thereon indicative of the locations for proper placement of:
       1) a napkin,
       2) a plate,
       3) flatware including a knife, dinner fork, salad fork and spoon, and
       4) two drinking vessels,
    said emblems each being filled-in outlines of an item to be placed thereon and colored a distinctive primary color;
    b) a set of a napkin, a plate, flatware and two drinking vessels for a child with special educational needs to place on the mat, said plate, flatware and drinking vessels having colors that match a corresponding color of the emblem therefor on said mat, each of said flatware being made of a metallic operative part and a non-metallic handle part having color that matches a corresponding color of the emblem therefor on the mat;

said napkin having color and shape indicia to assist the child in learning how to properly fold said napkin;

c) a teaching criteria manual having instruction for a teacher to guide the student in a process of setting the table by using matching colors and shapes to appropriately place the napkin, plate, flatware and drinking vessels on the mat; and d) a carton sized to contain said mat and said napkin, plate, flatware and drinking vessels within the carton, without the need of folding said mat, said carton having a closeable and lockable lid and carry handle.

14. An apparatus as claimed in claim 13 wherein said mat has said emblems on a front side and has a plain backside and further comprising an overlay having emblems that have shapes but not color of the napkin, plate, flatware and drinking vessels, whereby the overlay can be provided to be placed on said backside of said mat to provide the child with shape information but not the color information as to the appropriate location of the napkin, plate, flatware and drinking vessels.

15. The apparatus as claimed in claim 13, wherein said mat comprises a front side including said emblems side and a backside, the backside of said mat having shaped emblems indicative of the locations for proper placement of a napkin, a plate, flatware, and drinking vessels, whereby the mat can be placed front side down to obscure the front side and expose said backside to provide the child with shape information as to the appropriate location of the napkin, plate, flatware, and drinking vessels.

16. A method of teaching a child with special educational needs about how to set a table comprising:

positioning a mat having emblems indicative of the locations for proper placement of a napkin, a plate, flatware and a drinking vessel within the child's reach, the emblems each being filled-in outlines of an item to be placed thereon and colored a distinctive color;

supplying to the child with special educational needs a napkin, a plate, flatware and a drinking vessel having colors that match corresponding colors of the emblem therefor on the mat; and encouraging the child to place the napkin, plate, flatware and drinking vessel on the emblems on the mat.

17. A method of teaching a child with special educational needs about how to set a table comprising:

positioning within the child's reach a mat having emblems on a front side thereof front side down to obscure the front side and exposing a plain backside, positioning a transparent overly sheet on the mat with emblems that have shapes but not colors within the periphery of the emblem and corresponding to the outline of a napkin, a plate, flatware and a drinking vessel.

supplying to the child with special educational needs a napkin, a plate, flatware and a drinking vessel having shapes that match corresponding shapes of the emblem therefor on the overlay; and encouraging the child to place the napkin, plate, flatware and drinking vessel on the emblems on the overlay.

18. A method of teaching a child with special educational needs about how to set a table comprising:

positioning within the child's reach a mat having emblems on a front side;

placing said front side down to obscure said front side and exposing a backside having emblems that have shapes but not colors within the periphery of the emblems, wherein said emblems on both said front and back side correspond to the outline of a napkin, a plate, flatware, and a drinking vessel;

supplying to the child with special educational needs a napkin, a plate, flatware and a drinking vessel having shapes that match corresponding shapes of the emblem therefor on the mat; and encouraging the child to place the napkin, plate, flatware and drinking vessel on the emblems on the mat.

19. A method of teaching a child with special educational needs table setting skills, the method comprising:

positioning within the child's reach a mat having a front side comprising emblems and a plain backside, the emblems being indicative of the locations for proper placement of a napkin, a plate, flatware, and a drinking vessel, and comprising a filled-in outline in a distinctive color, the outline substantially corresponding to the shape of an item to be placed thereon;

supplying to the child a napkin, a plate, flatware, and a drinking vessel having colors and outlines that substantially match corresponding outlines and colors of the emblem therefor on the front side of the mat;

encouraging the child to place the napkin, plate, flatware, and drinking vessel on the corresponding emblems on the front side of the mat;

positioning within the child's reach the mat front side down to obscure the front side and exposing the plain backside;

positioning on the backside of the mat an overlay with emblems that have outlines indicative of the locations for proper placement of a napkin, a plate, flatware, and a drinking vessel;

supplying the child a napkin, a plate, flatware, and a drinking vessel having outlines that substantially match corresponding outlines of the emblem therefor on the overlay; and encouraging the child to place the napkin, plate, flatware, and drinking vessel on the corresponding emblems of the overlay.

20. A method of teaching a child with special educational needs table setting skills comprising:

positioning within the child's reach a mat having a front side comprising emblems and a plain backside, the emblems being indicative of the locations for proper placement of a napkin, a plate, flatware, and a drinking vessel, and comprising a filled-in outline in a distinctive color, the outline substantially corresponding to the shape of an item to be placed thereon;

supplying to the child a napkin, a plate, flatware, and a drinking vessel having colors and outlines that substantially match corresponding outlines and colors of the emblem therefor on the front side of the mat;

encouraging the child to place the napkin, plate, flatware, and drinking vessel on the corresponding emblems on the front side of the mat;

positioning within the child's reach the mat front side down exposing the backside, the backside comprising outlines indicative of the locations for proper placement of a napkin, a plate, flatware, and a drinking vessel;

supplying the child a napkin, a plate, flatware, and a drinking vessel having outlines that substantially match corresponding outlines of the emblem therefor on the backside of the mat; and encouraging the child to place the napkin, plate, flatware, and drinking vessel on the corresponding emblems on the backside of the mat.

* * * * *

UNITED STATES PATENT AND TRADEMARK OFFICE
CERTIFICATE OF CORRECTION

PATENT NO. : 6,129,550
DATED : October 10, 2000
INVENTOR(S) : Culberson et al.

It is certified that error appears in the above-identified patent and that said Letters Patent is hereby corrected as shown below:

Title page,
In addition to the references cited in section [56], the following references should be added:

U.S. PATENT DOCUMENTS

| | | | |
|---|---|---|---|
| 3,674,264 | 7/1972 | Boercker | 273/1R |
| 3,690,017 | 9/1972 | Holmquist | 35/24R |
| 4,168,583 | 9/1979 | Halpern | 35/31D |
| 4,604,062 | 8/1986 | Woods | 434/88 |
| 4,775,321 | 10/1998 | Comeaus et al. | 434/110 |
| 5,066,234 | 11/1991 | LeDesma | 434/205 |
| 5,282,740 | 2/1994 | Okayasu | 431/344 |
| 5,435,728 | 7/1995 | Fula et al. | 434/258 |
| 5,538,432 | 7/1996 | Dondero et al. | 434/258 |
| 5,799,942 | 9/1998 | Birt | 273/256 |

OTHER PUBLICATIONS

Delta Education Catalog, Spring 1999, page 7.

Column 7, claim 17,
Line 50, replace "overly" with -- overlay --.

Signed and Sealed this

Twentieth Day of November, 2001

Attest:

NICHOLAS P. GODICI
Attesting Officer    Acting Director of the United States Patent and Trademark Office